United States Patent [19]
Gornish et al.

[11] Patent Number: 5,752,037
[45] Date of Patent: May 12, 1998

[54] METHOD OF PREFETCHING DATA FOR REFERENCES WITH MULTIPLE STRIDE DIRECTIONS

[75] Inventors: Edward H. Gornish, Palo Alto; Anne M. Holler, San Jose; Wei Chung Hsu, Cupertino, all of Calif.

[73] Assignee: Hewlett-Packard Company, Palo Alto, Calif.

[21] Appl. No.: 639,134

[22] Filed: Apr. 26, 1996

[51] Int. Cl.$^6$ .................................................. G06F 9/45
[52] U.S. Cl. ........................ 395/709; 711/157; 711/3
[58] Field of Search .................................... 395/705, 709, 395/583, 584, 588; 711/3, 157

[56] References Cited

U.S. PATENT DOCUMENTS 5,333,291  7/1994  Grunbok et al. ..................... 711/157
5,357,618  10/1994  Mirza et al. ........................... 711/3

OTHER PUBLICATIONS

"A Fortran Compiler for the FPS-164 Scientific Computer", Touzeau R. F., Proc. ACM SIGPLAN Notices v19 n6, Jun. 1984.

"A Loop Transformation Theory and an Algorithm to Maximize Parallelism" by Michael E. Wolf et al., IEEE Transactions on Parallel and Distributed Systems, vol. 2, No. 4, Oct. 1991.

"Design and Evaluation of a Compiler Algorithm for Prefetching" by Todd C. Mowry, et al., Computer Systems Laboratory, Stanford University, ASPLOS V, Oct. 1992.

*Primary Examiner*—Emanuel Todd Voeltz
*Assistant Examiner*—Kakali Chaki

[57] ABSTRACT

There are two separate, yet related, prefetching strategies used for data references used having multiple strides, which typically occur in data references within nested loop structures. The first approach attempts to reverse one or more of the nested loops so that the strides of the reference are in the same direction. Once the loop or loops are reversed, data elements can be prefetched in the common loop direction. Preferably, the inner loops are reversed as compared with the outer loops, but this is not essential. The second approach is used where the data reference has multiple strides and the loops cannot be reversed. In this case, the prefetching method prefetches in the opposite direction of the innermost loop that surrounds the data reference. The second approach is used when the first approach cannot be used and where the strides of the reference have different directions and the inner loop is expected to iterate relatively few times. In such a case the second approach produces better results than the prior art.

20 Claims, 5 Drawing Sheets

METHOD OF PREFETCHING DATA FOR REFERENCES WITH MULTIPLE STRIDE DIRECTIONS

BACKGROUND OF THE INVENTION

This invention relates generally to compilers and more particularly to methods of prefetching data so as to minimize the time spent waiting for data.

It is a well known fact that microprocessors speeds have increased at a much more dramatic rate than the underlying memory which supplies their data. Modern microprocessors have a voracious appetite for data. Even the most basic RISC microprocessor requires at least two data elements per clock cycle. With clock cycles in excess of 100 MHz, these microprocessors place tremendous demands on the underlying memory system. Unfortunately, the predominant technology, i.e., dynamic random access memory (DRAM) cannot meet this demand.

Computer architects developed the concept of a memory hierarchy to address the growing divergence between processor speed and DRAM speed. A basic memory hierarchy is shown generally at 10 in FIG. 1. The concept behind a memory hierarchy is to place faster, yet smaller, memories closer to the microprocessor 12. The reason this concept works is because of the principles of locality. Principle of temporal locality teaches that if an item is currently being referenced it will likely be referenced again soon. The principle of spacial locality, on the other hand, suggests that if an item is referenced, items nearby will likely also be referenced. The memory hierarchy takes advantage of these principles by moving data that is currently in use, and that data likely to be used in the future, closest to the microprocessor. Since this is only a subset of the entire data set, smaller memories can be used closer to the microprocessor, which do have lower latencies.

The classic memory hierarchy shown in FIG. 1 includes four levels. The first level in the hierarchy is the register set 14 within the CPU itself. If a data element is in one of these registers, then the microprocessor 12 effectively has unfettered access to that data and can operate at its maximum rate. The second level in the hierarchy is a cache memory 16. As is known in the art, caches are typically comprised of static random access memory (SRAM) to provide lower latency than DRAM. Unfortunately, an individual SRAM cell requires significantly more silicon area than a corresponding DRAM memory cell. As such, cache 16 is typically on the order of 64 KB to 1 MB. As shown in FIG. 1, the microprocessor 12 can access data within the cache within approximately one to two cycles, although even this latency is beginning to increase as microprocessor technology continues to outperform SRAM technology. If the cache is designed properly, the microprocessor experiences little to no performance degradation if data is not present in its local registers, but must instead be fetched from cache 16.

The next level in the memory hierarchy is the main memory 18, which is typically comprised of DRAM. Since it has significantly higher density than the SRAM used for the cache, the size of the main memory is generally several orders of magnitude greater than the size of the cache. The increased size, however, comes at a price: the memory latency is also one to two orders of magnitude slower than for the cache.

The final level in the hierarchy is typically a disk 20, which requires thousands of cycles to access. Because this latency is so long, the operating system will schedule another process to run while the required data is being fetched from disk.

Compiler designers use a technique known as data prefetching in order to avoid the significant latencies associated with the lower levels in the memory hierarchy. The reason this technique, or series of techniques, work is because of the principles of locality. As is known in the art, cache memory 16 is organized as a plurality of lines. Each line contains multiple data elements. If the microprocessor 12 requests a data element from the cache that is not currently present therein, the cache will fetch that element from main memory along with all of the other elements in the cache line. Even though such a memory fetch will take more bandwidth than to simply fetch the required element, the other elements will also likely be required according to the principle of spacial locality since the elements that make up the line are adjacent in memory. The cache then in effect prefetches these other elements under the assumption that they will be referenced. Typically, this assumption turns out to be correct. If so, the microprocessor 12 will incur little to no delay when these elements are fetched, because they are present in the cache.

There are also software techniques for prefetching data. The advantage of these software techniques is that they know, in most cases, with certainty that a data element will be required in the future. The software can then fetch this data ahead of time so as to ensure that the data is readily accessible to the microprocessor when it is required. The most obvious example of when software prefetching can be used is where each element of an array will be referenced in, for example, a loop. The compiler knows that when it encounters such a loop that all of the elements will eventually need to be referenced. Thus, the compiler can fetch elements ahead of when they are needed so that when they are needed the data can be fetched without incurring any significant delay. How far in advance the microprocessor must fetch or "prefetch" is determined by the four variables: the stride distance (S); the latency (L) between main memory and the cache; the loop iteration time (T); and the cache line size (N). In fact, the so-called prefetched distance (P) can be computed based on these four variables according to the following formula:

$$P = \frac{S(L/T)}{N}$$

where L and T are measured in cycles, N is expressed in terms of the number of data elements in the cache line, and P is expressed in units of cache line size. This relationship intuitively makes sense since, as the latency increases, the compiler will have to fetch further in advance to allow sufficient time for the element to be brought from main memory to the cache. The prefetch distance, on the other hand, has the opposite relationship to the loop iteration time. The longer the loop iteration time, the more time the data has to move from main memory to the cache. Thus, the prefetch distance is inversely proportional to the loop iteration time (T). The prefetch distance is also a function of the cache line size because for each reference the cache will automatically fetch the entire line from main memory. Therefore, a single prefetch is required for every N data elements. Accordingly, the expression for p is divided by N. As used hereinafter, N is assumed to be equal to one data element per cache line size for ease of illustration. The invention, however, is not limited thereto, but instead operates with any line size.

One simple way to accomplish prefetching in software is for the compiler to insert a load instruction, which moves the data elements into a register. Then when the data element is actually required it will be in a register and then can be operated on by the microprocessor. Subsequent prefetches can then move data elements into other registers. The problem with this approach is that the compiler quickly runs out of available registers.

Another approach is to attempt to load each prefetched data element into a predetermined register. Thus, only a single register is consumed. In those architectures where one register is "hard wired" to zero, the load can be made to this register so that the instruction is ineffectual, i.e., the data is not actually written into the register, however, it is stored in the cache. More advanced microprocessors recognize this instruction as a prefetch operation and do not even attempt to write the data into the register itself. This technique works for well-behaved loops such as the following example.

The following FORTRAN code segment illustrates the advantage of prefetching data:

```
dimension b (n,n)
    do 100 i = 1,n,1
        do 200 j = 1,n,1
            a = a + b (j,i)
            prefetch(b(j + p,i))
200     continue
100 continue
```

In this example, the prefetch instruction, which is implemented by any of the approaches discussed above, will prefetch all of the elements of array b with the exception of the first p elements, where p is the prefetch distance. This is illustrated graphically in FIGS. 2 and 3. FIG. 2 shows a two-dimensional graphical representation of the loop for the case of j=4. Each box represents the (j,i) iteration of the loop. Inside each of those boxes is the memory location of the element of array b fetched in that iteration (assuming that the array b starts at address 1). As can be seen in FIG. 2, each successive iteration fetches the next sequential memory location. These elements are adjacent because FORTRAN uses column-major order, i.e., b (j,i) and b (j+1, i) are adjacent. Most other languages including the C language use row-major order in which case the arguments of the array would have to be switched in order to produce adjacent elements in successive iterations. The invention described hereinafter applies equally as well to languages which use the row-major order as well as those such as FORTRAN that use the column-major order.

The prefetching operations are illustrated in FIG. 3. A prefetch distance of three is assumed (p=3) for this illustration. Even though this is a rather short prefetch distance, it make the illustration simpler. When the first element of the array is accessed (1) the first prefetch instruction (P1) prefetches the fourth element (4). In the next iteration of the loop, when the second element (2) is fetched, the fifth element of the array (5) is fetched in a second prefetch (P2). This continues for each successive iteration of the loop so that each iteration prefetches the memory location three ahead of the current location. It should be apparent that each of these prefetches is useful (with the exception of the last few) in that all of the elements prefetched will eventually be required by the loop. Moreover, they are all fetched in time because they are fetched the proper distance away. Thus, where both loops have a common direction, this method of prefetching works particularly well.

The above-described method does not work particularly well, however, where the direction of the inner loop is different than the direction of the outer loop. Such a case is illustrated by the FORTRAN code section given below:

```
dimension b (n)
    do 100 i = 1,n,1
        do 200 j = n,1,-1
            a = a + b (j,i)
            prefetch (b(j - p,i))
200     continue
100 continue
```

In this example, the outer loop index is being incremented from 1 to n by 1 while the inner loop is being decremented from n to 1 by −1. FIG. 4 is a two-dimensional graphical representation of this case where the inner loop is iterated four times for every outer loop iteration. In the first iteration of the outer loop, elements 4, 3, 2, 1, in that order, are accessed from the b array. In the second iteration of the outer loop, elements 8, 7, 6, 5 are accessed in that order. FIG. 5 shows the results of applying the prefetch technique shown in FIG. 3 to the code segment illustrated in FIG. 4. That technique attempts to fetch ahead of the current memory location by the prefetch distance. Because the inner loop is proceeding backwards, the prefetch method fetches in that direction since the lower address elements are required in the future, at least for the current inner loop. Hence, a prefetch instruction of prefetch (j−p,i) is used.

In the first iteration of the loop, the fourth element (4) of the array b is accessed. The corresponding prefetch instruction (P1) fetches the first elements of the array (1). This is a useful prefetch since, as shown in FIG. 4, the first element will be required on the fourth iteration of the inner loop during the current iteration of the outer loop. The subsequent prefetches during this outer loop iteration (P2, P3, P4), however, fetched undefined data outside of the array. Thus, these prefetches are useless since none of this data is required by the loop. Moreover, these elements will occupy valuable space inside the cache. A similar result occurs on subsequent iterations of the outer loop. For example, during the first iteration of the inner loop during the second iteration of the outer loop, the eighth element (8) of array b is accessed. The corresponding prefetch instruction (P5) prefetches the fifth element (5) of the b array. This again, as with P1, produces a useful prefetch since the fifth element is required for the fourth iteration of the inner loop during the current outer loop iteration. The next three prefetches, however, prefetch old data. Although these elements are within the array, they are useless since these elements will not be required in the future. For example, prefetch P6 corresponding to the seventh element (7) of the b array prefetches the fourth element (4) of the array, which is not required for any of the subsequent loop iterations. Thus, this prefetch was ineffective and produced additional instruction overhead. Of course, if the number of inner loop iterations (i) is much greater than the prefetch distance, then many of the prefetches will actually fetch useful data. However, in cases such as those shown in FIGS. 4 and 5 where this condition is not met, the prior art prefetch method is largely ineffective.

Accordingly, a need remains for an effective data prefetching method for references with multiple stride directions.

SUMMARY OF THE INVENTION

It is, therefore, an object of the invention to provide a compiler for efficiently and effectively prefetching data references in cases with multiple stride directions.

The invention accomplishes this objective in two ways. The first is through a technique known as loop reversal.

Loop reversal is used to make sure that the strides of the reference have the same direction. In the example described above, this can be accomplished by reversing either one of the two loops so that their stride directions are the same. This technique can be extended to cases involving more than two nested loops. In those cases, the method works from inner loop to outer loop trying to align the directions of the strides. Loop reversal is an example of a class of loop transformations known as unimodular transformations. Frameworks for performing unimodular transformations already exist. Loop reversal has been used for other purposes, e.g., paralyzing a loop nest. However, it has never been used to align the stride directions for the purpose of improving prefetch efficiency.

In the second aspect of the invention, the prefetches for the inner loop can be reversed (i.e., their offsets can be negated) in order to prefetch in a manner that is useful for the anticipated references given the direction of the outer loop. In effect, the second technique prefetches in the opposite direction of the inner loop and in the direction of the outer loop. This second approach does not depend upon a unimodular transformation framework, but has a more limited applicability than the first. The second approach is used when the first approach cannot be used and where the strides of the reference have different directions and the inner loop is expected to iterate relatively few times. In such a case the second approach produces better results than the prior art.

An advantage of the invention is that it does not increase the code size.

Another advantage of the invention is that it does not increase run-time overhead.

The foregoing and other objects, features and advantages of the invention will become more readily apparent from the following detailed description of a preferred embodiment of the invention which proceeds with reference to the accompanying drawings.

DETAILED DESCRIPTION

Figure 6:
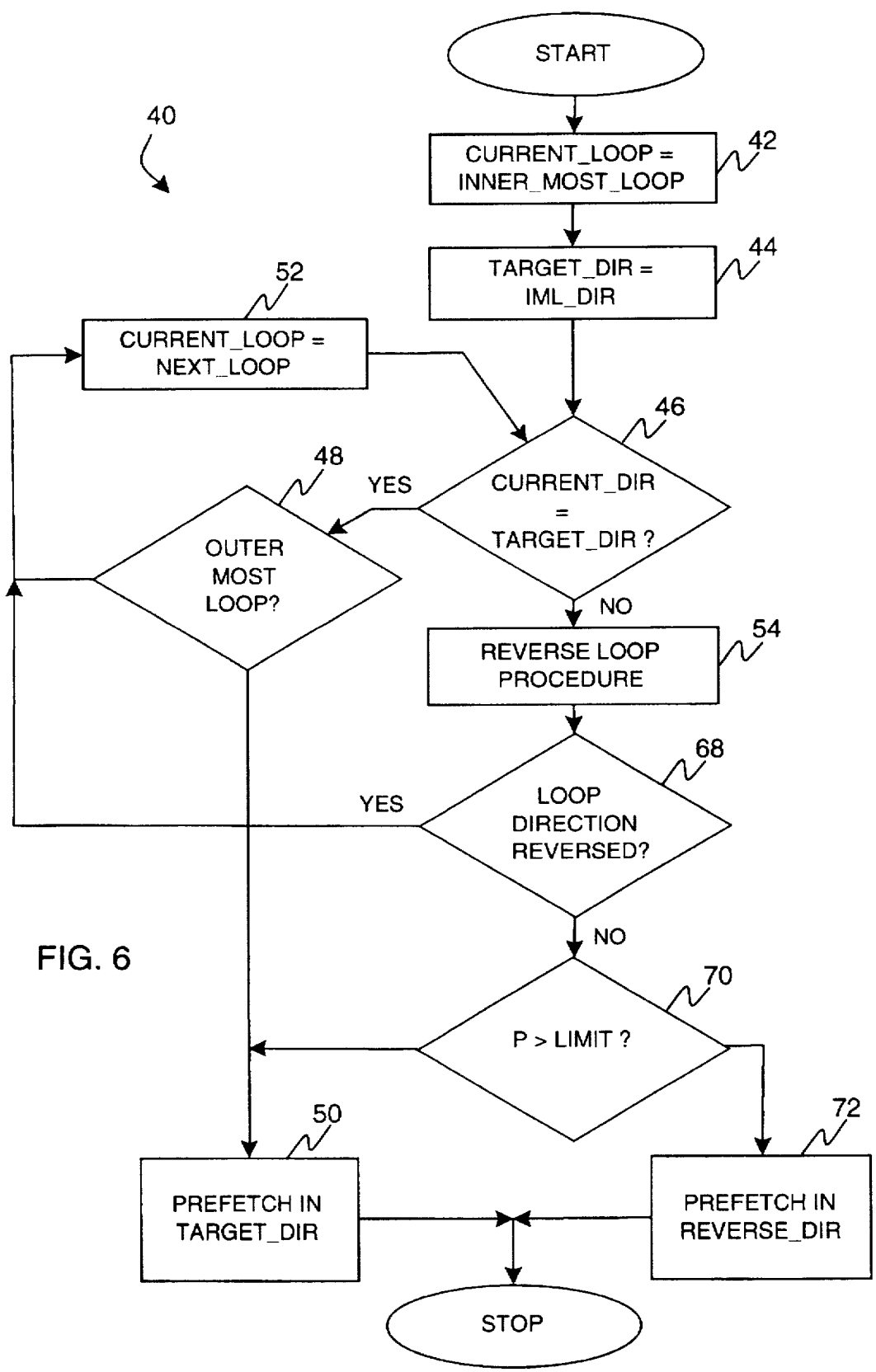
FIG. 6 is a flow chart showing the top level procedure according to the invention.

Referring now to FIG. 6, a flow chart showing the optimization steps according to the invention is shown generally at 40. The method 40 includes both of the prefetch optimizations mentioned above. In the preferred embodiment, this method is implemented in a high-level programming language such as C or C++ and forms one part of a compiler, in particular, an optimizing compiler. One of ordinary skill in the art could implement this method in their preferred language based on the discussion given below.

The following discussion assumes a nested loop, which can include an arbitrary depth, i.e., N number of loops. The most nested loop for a given reference is referred to herein as the "innermost loop" and it is this loop that is executed the greatest number of times. The main outside loop, which is executed the fewest number of times, is referred to as the "outermost loop." In general, the method attempts to optimize the prefetch of the innermost loop, because it is executed the greatest number of times and optimizing the prefetch associated with this loop produces the fewest adverse consequences on references made in the outer loops. As will become more evident in the discussion below, however, optimizations can be made at other loop levels as well, depending upon the strides of the respective loops.

The first step in the method 42 is to initialize a variable CURRENT_LOOP, which is set equal to INNER_MOST_LOOP. Thus, the variable CURRENT_LOOP, which can be an object, contains the information about the innermost loop that determines its behavior including its stride length and direction. In this context, stride direction refers to either forward or backward, such as illustrated above.

Figures 4, 5:
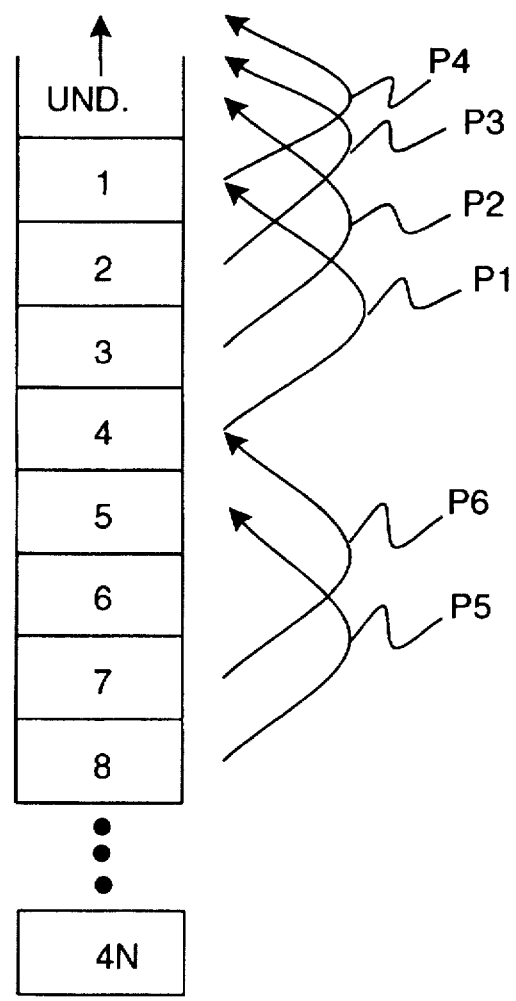
FIG. 4 is a two-dimensional representation of a two-deep nested loop where the strides of the reference have different directions.
FIG. 5 is an illustration of a two-dimensional array organized linearly which shows several prefetch references for the nested loop shown in FIG. 4.

In step 44, another variable TARGET_DIR is initialized to the direction of the innermost loop IML_DIR. As will be discussed further below, one of the optimizations is to align all of the stride directions so as to avoid the prefetch problems illustrated above in FIGS. 4 and 5. The optimization accomplishes this by trying to align the loops, at least initially, in the direction of the innermost loop.

Next, the method determines the stride direction of the current loop, as determined by the variable CURRENT_LOOP, and compares that direction with the target direction TARGET_DIR. If the direction of the current loop (CURRENT_DIR) is equal to the target direction (TARGET_DIR), then step 46 transitions to step 48, which determines whether the current loop is the outermost loop of the nested loops. If the current loop is, in fact, the outermost loop, then the loops are aligned and the method prefetches in the direction of the innermost loop (IML_DIR) as specified by TARGET_DIR in step 50. If the current loop is not the outermost loop, which would be true in this case where the number of nested loops is equal to or greater than two, step 48 transitions to step 52 wherein the variable CURRENT_LOOP is set equal to NEXT_LOOP, which is the loop outwardly adjacent to the CURRENT_LOOP. Step 46 is then again executed.

Figure 7:
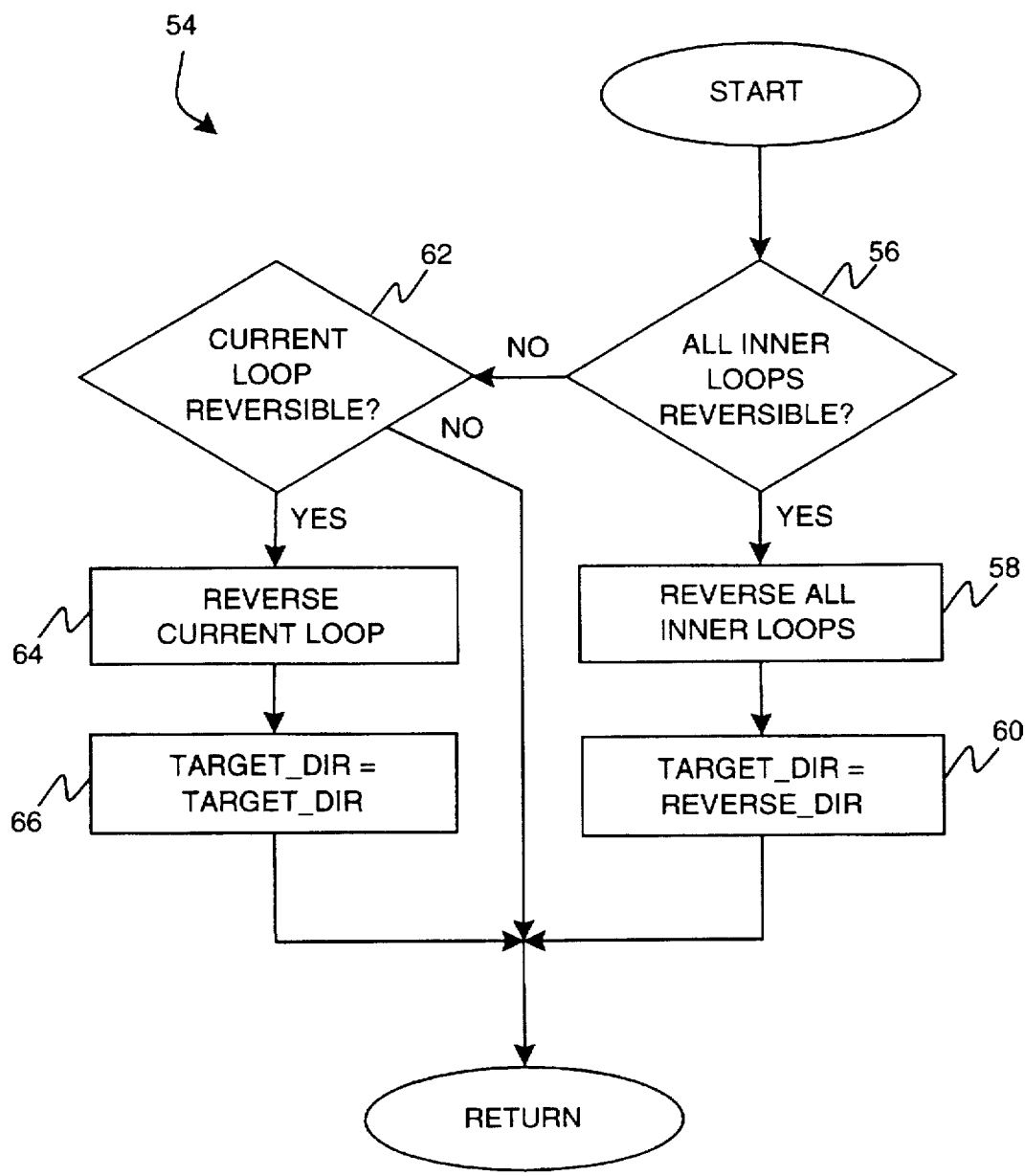
FIG. 7 is a flow chart of the first aspect of the invention shown in FIG. 6.

If the direction of the current loop is not equal to the target direction, then the method 40 invokes the reverse loop procedure in step 54 that attempts to align the loops so as to avoid the prefetch problems shown and described above with reference to FIGS. 4 and 5. The steps associated with the reverse loop procedure 54 are shown in more detail in FIG. 7. The reverse loop procedure attempts to do one of two things. First, procedure 54 attempts to align all of the inner loop directions with the current loop direction so that all of the loops from the current loop down to the innermost loop are aligned. This is represented by the right-hand branch in FIG. 7 comprised of steps 56, 58 and 60. Thus, in step 56, the procedure checks to see whether all of the inner loops are reversible, i.e., the loops inward of the current loop to the innermost loop. Loop reversal is an example of a class of loop transformations known as unimodular transformations. Determining when a loop can be reversed is a technique that is known in the art. See, e.g., "Improving Locality in Parallelism in Nested Loops," Michael Edward Wolf and Monica S. Lam, "A Loop Transformation Theory and an Algorithm to Maximize Parallelism," IEEE Trans. on Parallel and Distributed Systems, Vol. 2, No. 2, pp. 452–71 (October 1991). Accordingly, this step is not discussed further. If all of the inner loops are reversible, then it is preferable to reverse all of the loops inwardly of the current loop mainly for purposes of aligning subsequent outward loops. In that case, all of the inner loops are reversed in step 58 using the known technique of loop reversal as discussed, for example, in Wolf. Although loop reversal has been used for other purposes (e.g., parallelizing a loop nest), it has never been used for the purpose of optimizing prefetching.

Once the inner loops have been reversed in step 58, the variable TARGET_DIR is changed to be equal to the direction that the inner loops have now been reversed to, i.e., REVERSE_DIR. The procedure then returns to the main loop in FIG. 6.

The left-hand branch of procedure 54 is executed in the event that one or more of the inward loops are not reversible as taught by Wolf, among others. The procedure then checks in step 62 to see whether the current loop is reversible. If the current loop is reversible, as taught by Wolf, the current loop is reversed in step 64 using the known unimodular technique. In that case, the current loop direction is aligned with the innermost loop direction (IML_DIR) so that the target direction (TARGET_DIR) remains the same as is shown in step 66. Of course, this step need not actually be performed since the contents of the variable does not change. However, step 66 is shown for purposes of illustration. The procedure then returns to the main loop. If the current loop is non-reversible, as determined in step 62, the procedure 54 simply terminates and returns to the main loop at step 68.

At the conclusion of procedure 54, the method 40 checks in step 68 to determine whether one or more of the loops have been reversed by procedure 54. This can be accomplished by setting a global flag in procedure 54 that step 68 checks. This flag would be initially cleared and then set in either step 58 or 64 depending upon the conditions of the nested loops. If one or more of the loops had been reversed, the method 40 sets the CURRENT_LOOP equal to NEXT_LOOP in step 52. The NEXT_LOOP is the outwardly adjacent loop from the CURRENT_LOOP.

The above-described procedure is then repeated in this way for each outward loop until the outermost loop is encountered in step 48. Once the outermost loop is encountered, the method will prefetch in the TARGET_DIR direction using conventional prefetching techniques in step 50. It should be apparent based on the description above that the target direction can switch back and forth if with each pass through the reverse loop procedure 54, all of the inner loops can be reversed. However, this may occur in only a fraction of the cases in practice since most nested loops do not have strides that switch back and forth in their direction.

In the context above, the phrase "innermost loop" does not necessarily refer to the innermost loop in the nested loop structure. As used herein, innermost loop refers to the innermost loop that surrounds a given reference. The significance of this distinction will become apparent upon examination of the following code sequence. Consider the following example:

```
do 100 i = 1,n
    do 200 j = 1,n
        a(j,i) = b(j,i)
        do 300 k = 1,n
            c(k,j,i) = d(k,j,i)
        300 continue
    200 continue
100 continue
```

When method 40 is executed for prefetching the reference b(j,i), the "do 300" loop is not relevant since the variable k is not an argument of the reference. In this case, the innermost loop is the "do 200" loop. Furthermore, the method only considers the "do 200" and "do 100" loops part of the loop nest for the reference b(j,i).

On the other hand, for the reference d(k,j,i), the innermost loop is, in fact, the "do 300" loop. In that case, all three loops are considered part of the nested loop structure for purposes of method 40. To deal with these situations, the phrase "innermost loop" is defined herein as the "innermost loop that surrounds a given reference" for which the prefetching optimizations are being performed.

Method 40 includes a second prefetching optimization that is independent from the first described above. In the second aspect of the invention, the prefetches generated for the innermost loop are reversed (i.e., their offsets are negated) in order to prefetch in a manner that is useful for the anticipated references given the direction of the outer loop. This second aspect does not depend on the unimodular transformation framework, but has more limited applicability than the first. This second approach is useful when the first approach cannot be used (e.g., loop cannot be reversed) and when the strides of the reference have different directions and the inner loop is expected to iterate relatively few times. It is this condition that is checked for in step 70. In that step, the prefetch distance P is compared to a limit, which is a function of the strides of the reference. In fact, the LIMIT can be expressed as follows, assuming a loop nest N with loops $L^1 \ldots L^N$, where $L^1$ is the outermost loop and $L^N$ is the innermost loop for a given reference:

$$\text{LIMIT} = \prod_{i=1}^{A-1} \frac{L^i . U}{2}$$

where $L^i . U$ is the loop bound for the ith loop in the nested loop structure; and where A is equal to the current loop.

If this condition is not satisfied, then the second prefetching approach is not as useful as the conventional prefetching technique described above. Accordingly, in that case, step 50 is executed and the method prefetches in the TARGET_DIR direction.

If, on the other hand, this condition is satisfied, i.e., p>LIMIT, then the method according to the invention prefetches in the REVERSE_DIR direction, i.e., the opposite direction of the target direction. Alternatively, the prefetches can be first generated in this target direction (TARGET_DIR) and then reversed if this condition is satisfied.

Figure 8:
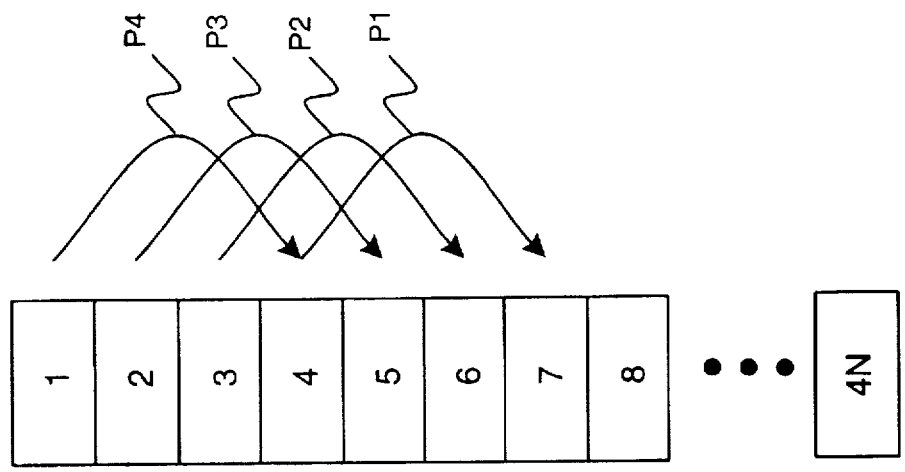
FIG. 8 is a flow chart showing the second aspect of the invention shown in FIG. 6.
Figure 1:
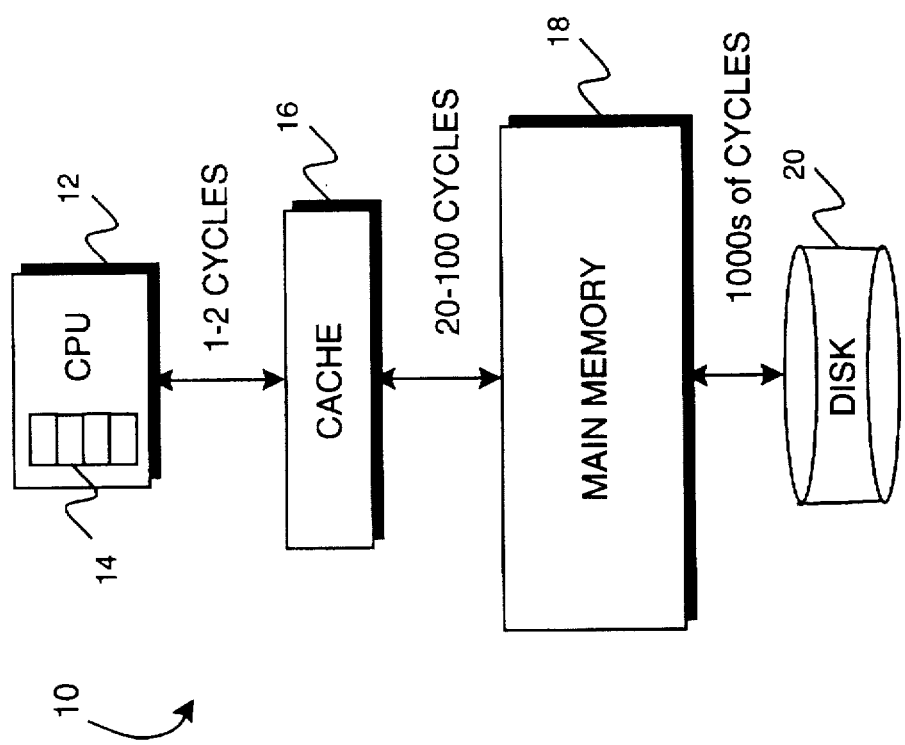
FIG. 1 is a block diagram of a prior art memory hierarchy.
Figures 2, 3:
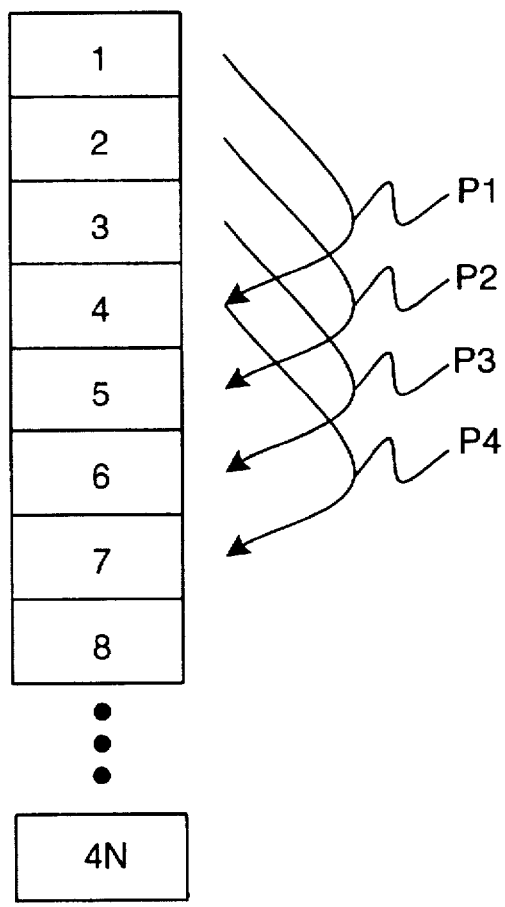
FIG. 2 is a two-dimensional graphical representation of a two-level nested loop where the strides of the reference have the same directions.
FIG. 3 is an illustration of a two-dimensional array organized linearly which shows several prefetch references for the nested loop shown in FIG. 2.

The effect of step 72 is illustrated in FIG. 8. The following description pertains to the loop graphically illustrated in FIG. 4 where each data reference has multiple strides. As in the description above, the prefetch distance (P) is assumed to be equal to three, however, the invention is not limited to any particular prefetch distance. The applicability of this approach, i.e., its usefulness, is determined according to the relationship between the prefetch distance and the strides as given in the expression above. In the first iteration of the nested loop (i.e., (4.1)), the fourth element (4) of the linear array is accessed. If the prefetch distance satisfies the above expression, the first prefetch (P1) prefetches in the direction of the outer loop, i.e., in the opposite direction of the inner loop, to prefetch the seventh element (7). This is in contrast to the prior art method described above and shown in FIG. 5, which would have prefetched the first element (1) according to the direction of the inner loop. As with the prior art method, the prefetching method according to the invention, prefetches a useful data element that can be used in a future iteration (i.e., (2.2)).

In the next iteration of the inner loop (i.e., (2.1)), the advantage of the second approach becomes clear. During this iteration, the third element (3) is referenced. The method according to the invention prefetches in the direction of the outer loop, i.e., the direction opposite the inner loop direction, to prefetch the sixth element (6) in the array. These are illustrated by prefetch P2. Again, this produces a useful prefetch since the sixth element (6) will be required in a subsequent iteration (i.e., (3.2)). The prior art method shown in FIG. 5, however, prefetches data outside the array. Thus, where the prior art method prefetches useless data, this second approach prefetches useful data. The same results occurs for the third prefetch (P3). This second approach prefetches the fifth element in the linear array (5), which will be required in iteration (4.2). As for the second prefetch, however, the prior art method prefetches undefined data outside of the array.

The limitation of this approach, however, is illustrated in the fourth prefetch (P4). In this iteration (4.1), where the first element (1) of the array is referenced, this second approach according to the invention prefetches the fourth element (4) of the array. Unfortunately, this is an old element since it was used in the first iteration (1.1) of the loop. Thus, this prefetch was ineffectual. It is this limitation that leads to the generalized expression above that is a function of the prefetch distance in the number of loop iterations. The above expression, however, is given for a loop structure where the loop bounds of the data reference are a function of each of those loop variables. Equivalent expressions can be made where the loop bounds of the data reference are not a function or one or more of those nested loops. Alternatively, the expression would hold if for those cases, $L^i$ . U is considered equal to one. This limit value was chosen by optimizing certain parameters in the system including ease of implementation as well as overall performance. The method also works for other limit values based on other expressions arrived at by making other trade-offs. Accordingly, the invention is not limited to the limit expression given above.

In the preferred embodiment, the above-described methods are implemented in a high-level language and included as part of a compiler, which is typically bundled as part of an operating system, but can be sold separately. As such, each of the steps described above can be implemented as objects or procedures using conventional programming techniques. Once written and compiled into object code itself, the compiler could be run on any number of computer hardware platforms including workstations sold by the assignee of the present assignee, Hewlett-Packard, based on its proprietary Hewlett-Packard Unix (HP-UX) operating system or so-called IBM compatible computers based on the Intel X86 family of microprocessors, which use DOS or Windows-based operating systems sold by Microsoft. The compiler according to the invention is not limited to any one particular hardware platform.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method of prefetching data elements having multiple strides for a data reference at an inner loop of a nested loop structure, the method comprising the steps of:

determining a direction of an inner loop;

determining a direction of an outer loop, the inner loop being nested inside the outer loop;

identifying a data reference within the inner loop, the data reference having strides determined by the directions of the inner and outer loop;

reversing the direction of one of the loops so that both loops have the same direction if the direction of the inner loop is different than the direction of the outer loop; and prefetching a data element in the common direction of the loops.

2. A method of prefetching data elements according to claim 1 wherein the step of reversing the direction of one of the loops so that both loops have the same direction includes reversing the direction of the inner loop.

3. A method of prefetching data elements according to claim 1 wherein the step of reversing the direction of one of the loops so that both loops have the same direction includes reversing the direction of the outer loop.

4. A method of prefetching data elements according to claim 1 further comprising:

determining a direction of a second outer loop, the outer loop being nested inside the second outer loop;

reversing the direction of either the inner loop or the second outer loop so that both loops have the same direction if the direction of the inner loop is different than the direction of the second outer loop; and prefetching a data element in the common direction of the inner and second outer loops.

5. A method of prefetching data elements according to claim 4 wherein the step of reversing the direction of either the inner loop or the second outer loop so that both loops have the same direction includes reversing the direction of the second outer loop.

6. A method of prefetching data elements according to claim 4 wherein the step of reversing the direction of either the inner loop or the second outer loop so that both loops have the same direction includes:

reversing the direction of the inner loop; and reversing the direction of the outer loop so that the inner loop and the outer loop have a common direction.

7. A method of prefetching data elements according to claim 6 wherein the step of reversing the direction of the inner loop includes reversing the direction of the outer loop.

8. A method of prefetching data elements according to claim 1 further comprising:

determining whether one of the loops can be reversed if the direction of the inner loop is different than the direction of the outer loop; and reversing the direction of the loop that can be reversed so that both loops have the same direction if one of the loops can be reversed.

9. A method of prefetching data elements according to claim 1 further comprising the step of prefetching a data reference in the direction of the outer loop if one of the loops cannot be reversed.

10. A method of prefetching data according to claim 1 further comprising the steps of prefetching a data reference in the direction of the outer loop if the direction of the inner loop is different than the direction of the outer loop.

11. A method of prefetching data according to claim 1 wherein the step of prefetching a data reference in the direction of the outer loop if the direction of the inner loop is different than the direction of the outer loop includes the steps of:

determining a prefetch distance (p);

determining a number of times (m) the inner loop iterates; and prefetching a data reference in the direction of the outer loop if the following expression is satisfied: p>m/2.

12. A method of prefetching data elements having multiple strides, the method comprising the steps of:

is determining a direction of an outer loop;

determining a direction of an inner loop, the inner loop being nested inside the outer loop and a data reference having multiple strides being made in the inner loop; and prefetching a data reference in the direction of the outer loop if the direction of the inner loop is different than the direction of the outer loop.

13. A method of prefetching data according to claim 12 further comprising:

determining a prefetch distance (p);

determining a number of times (m) the inner loop iterates for each iteration of the outer loop;

comparing the prefetch distance (p) to the number of times (m) the inner loop iterates for each iteration of the outer loop; and prefetching a data reference in the direction of the outer loop only if the prefetch distance (p) is greater than the number of times (m) the inner loop iterates for each iteration of the outer loop.

14. A method of prefetching data according to claim 13 wherein the step of prefetching a data reference in the direction of the outer loop only if the prefetch distance (p) is greater than the number of times (m) the inner loop iterates for each iteration of the outer loop includes prefetching a data reference in the direction of the outer loop only if the following expression is satisfied: p>m/2.

15. A method of prefetching data according to claim 12 further comprising:

determining, according to a predetermined condition, that prefetching is not to be performed in the direction of outer loop;

reversing the direction of one of the loops so that both loops have the same direction; and prefetching a data reference in the common direction of the loops.

16. A method of prefetching data according to claim 15 wherein the step of reversing the direction of one of the loops so that both loops have the same direction includes reversing the direction of the inner loop.

17. An optimizing compiler comprising:

means for determining a direction of an inner loop;

means for determining a direction of an outer loop, the inner loop being nested inside the outer loop;

means for identifying a data reference having multiple strides within the inner loop, the strides being determined by the direction of the inner and outer loops;

means for reversing the direction of one of the loops so that both loops have the same direction if the direction of the inner loop is different than the direction of the outer loop; and means for prefetching a data element in the common direction of the loops.

18. An optimizing compiler according to claim 17 wherein said means for reversing the direction of one of the loops so that both loops have the same direction includes means for reversing the direction of one of the loops so that both loops have the same direction includes reversing the direction of the inner loop.

19. An optimizing compiler according to claim 17 wherein said means for reversing the direction of one of the loops so that both loops have the same direction includes means for reversing the direction of the outer loop.

20. An optimizing compiler according to claim 17 further comprising:

means for determining a prefetch distance (p);

means for determining a number of times (m) the inner loop iterates; and means for prefetching a data reference in the direction of the outer loop if the following expression is satisfied: p>m/2.

* * * * *